United States Patent [19]

Tarumizu et al.

[11] Patent Number: 5,043,802
[45] Date of Patent: Aug. 27, 1991

[54] FRAME STILL PICTURES WITH NO DOUBLE IMAGES

[75] Inventors: Hiroyuki Tarumizu, Kamakura; Hiroyasu Ohtsubo, Yokohama; Masaru Noda, Naka; Takuya Imaide; Tomoyuki Kurashige, both of Yokohama, all of Japan

[73] Assignees: Hitachi, Ltd., Tokyo; Hitachi Video Engineering, Inc., Yokohama, both of Japan

[21] Appl. No.: 470,720

[22] Filed: Jan. 26, 1990

[30] Foreign Application Priority Data

Jan. 27, 1989 [JP] Japan .................................. 1-16441
Feb. 20, 1989 [JP] Japan .................................. 1-38330
Feb. 22, 1989 [JP] Japan .................................. 1-40236

[51] Int. Cl.$^5$ ........................ H04N 9/64; H04N 5/213
[52] U.S. Cl. ..................................... 358/36; 358/167; 358/166; 360/33.1
[58] Field of Search ................... 358/166, 167, 36, 37, 358/209, 336, 213.11, 183; 360/33.1, 25

[56] References Cited

U.S. PATENT DOCUMENTS

| | | | |
|---|---|---|---|
| 4,142,211 | 2/1979 | Faroudja | 358/167 |
| 4,443,817 | 4/1984 | Faroudja | 358/167 |
| 4,527,200 | 7/1985 | Takahashi et al. | 358/208 |
| 4,597,021 | 6/1986 | Yamamitsu et al. | 358/336 |
| 4,613,909 | 9/1986 | Tobe | 358/336 |
| 4,616,255 | 10/1986 | Nakagaki et al. | 358/36 |
| 4,695,877 | 9/1987 | Matsumoto | 358/167 |
| 4,752,838 | 6/1988 | Nutting | 360/33.1 |
| 4,807,034 | 2/1989 | Takeuchi et al. | 358/36 |
| 4,864,424 | 9/1989 | Ochi et al. | 360/33.1 |
| 4,887,252 | 12/1989 | Miyakawa et al. | 358/167 |

*Primary Examiner*—James J. Groody
*Assistant Examiner*—Glenton B. Burgess
*Attorney, Agent, or Firm*—Antonelli, Terry, Stout & Kraus

[57] ABSTRACT

An image pickup apparatus is provided with a first adder which outputs a sum signal by adding a first luminance signal produced from the signals of odd-numbered lines of a solid-state image sensor and a second luminance signal produced from the signals of even-numbered lines of the solid-state image sensor, a first subtracter which outputs a difference signal by subtracting the first luminance signal from the second luinance signal, a noise reducer which reduces noise in the difference signal, a second adder which outputs a third luminance signal by adding the difference signal with its noise reduced to the sum signal, and a second subtracter which outputs a fourth luminance signal by subtracting the difference signal with its noise reduced from the sum signal. A frame still picture is formed from the third luminance signal and fourth luminance signal.

4 Claims, 16 Drawing Sheets

FIG. 2(a)
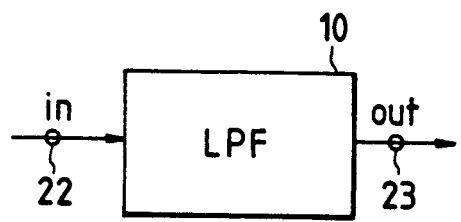
FIG. 2(b)
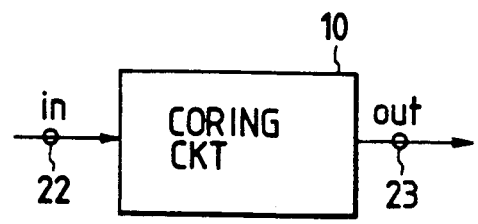
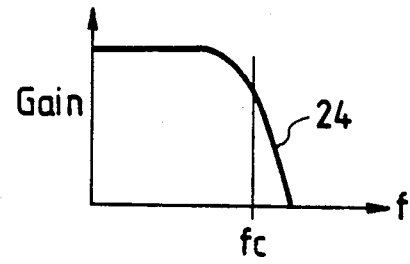
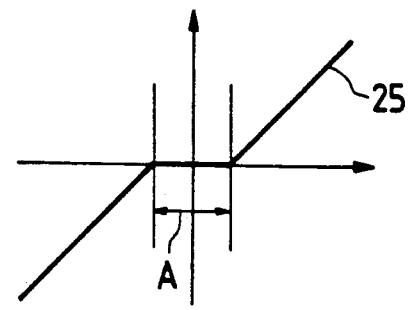
FIG. 2(c)
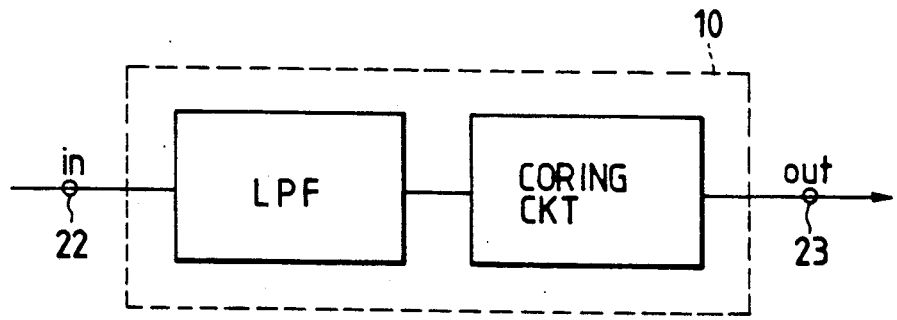

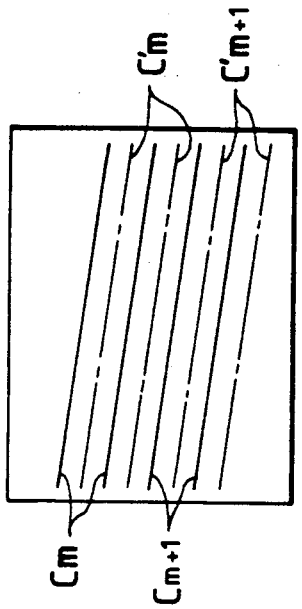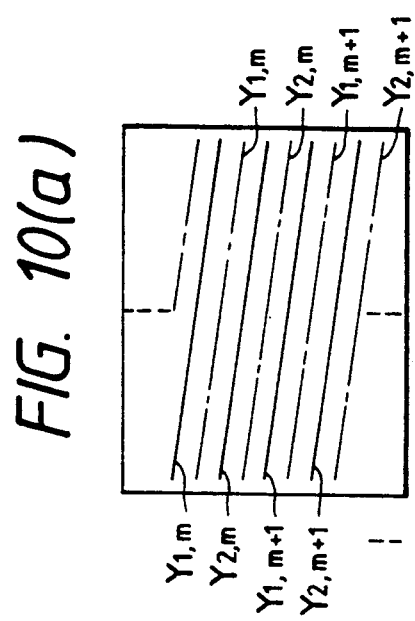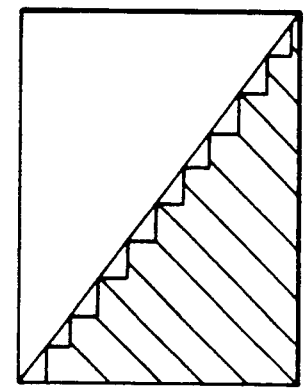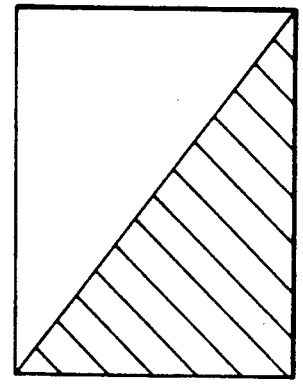

FRAME STILL PICTURES WITH NO DOUBLE IMAGES

BACKGROUND OF THE INVENTION

The present invention relates to an image pickup apparatus using a solid-state image sensor in which two lines are simultateously scanned, and more particularly, relates to an image pickup apparatus which outputs a still picture stopping one moment of a picture in motion and a zooming-in picture with an area of a picture enlarged by electronic means.

Video cameras and VTRs (video tape recorders) have become increasingly compact in size and light in weight, and recently their prevalence has been rapidly growing in the form of a so-called video camera combined with VTR.

In such a video camera combined with VTR, a camera tube was initially used as an image sensor, but that has been replaced by a solid-state image sensor which applies the LSI technology which is characterized by compactness, light weight, high reliability, high image quality, etc., so that the solid-state image sensor is presently taking the lead.

A type of the above mentioned solid-state image sensor is an MOS-type sensor in which two lines are simultaneously scanned. FIG. 16 shows a schematic illustration of said solid-state image sensor.

In the solid-state image sensor, photoelectric conversion elements, e.g. photodiodes, are lining up on a light receiving surface in the shape of a matrix, and moreover, color filters are placed in order on the photodiodes. Since one photodiode is equivalent to one picture element, the photodiode will be hereinafter called the picture element.

FIG. 16 is a schematic illustration showing one example of the array of picture elements in an MOS image sensor, in which example all color transmission (namely, transparent) filters W, green transimission filters G, cyan transmission filters $C_y$, and yellow transmission filters $Y_e$ are placed in order.

When video signals are read out from the image sensor, the charges, stored in the picture elements, of the $(2m-1)$-th line and the $2m$-th line are read out in turn from left in a first field, and the charges of the $2m$-th line and $(2m+1)$-th line are simulataneously read out in a second field. This is called "two-line simultaneous scan."

The signals corresponding with the individual color filters which have been read out by the above scan are called signal W, signal G, signal $C_y$, and signal $Y_e$. These signals, respectively, are outputted from independent terminals. The outputted signals W, G, $C_y$, and $Y_e$ are added or subtracted at a certain ratio, resulting in the production of chrominance signals (for example, a red signal R and a blue signal B) and a luminance signal Y. For example, signal Y is obtained by adding the signals W, G, $C_y$, and $Y_e$ at a ratio of about 1:1:1:1 as shown in the following formula:

$$Y = (W + G + C_y + Y_e) \cdots \quad (1)$$

Herein $W = R + G + B$, $C_y = G + B$, and $Y_e = G + R$, so that the formula (1) becomes as follows:

$$Y = 8\{\tfrac{3}{8}R + \tfrac{1}{2}G + \tfrac{1}{8}B\} \cdots \quad (2)$$

In NTSC formula the luminance signal Y has the following composition ratio:

$$R:G:B = 0.3:0.59:0.11 \cdots \quad (3)$$

whereas the ratio of mixture in the formula (2) is different from the foregoing ratio. However, since the sensitivity to the blue light (B) in the solid-state image sensor is lower than that to the red and green lights (R) and (G), in reality the ratio of mixture in the formula (2) becomes nearly equal to that in NTSC formula. Thus, the formula (2) leads to the production of the luminance signal Y which is almost equal to the luminance signal of NTSC formula.

As a result, the color and luminance signals required for the production of video signals can be obtained from the solid-state image sensor in which two lines are simultaneously scanned.

Now, using two picture element signals of the same line, consideration is made of the signals which are represented by the following formulae:

$$Y_1 = (W + G) \cdots \quad (4)$$

$$Y_2 = (C_y + Y_e) \cdots \quad (5)$$

In the same manner as in the above description, the following formulae are obtained by substituting $W = R + G + B$, $C_y = G + B$, and $Y_e = G + R$:

$$Y_1 = 4\{\tfrac{1}{4}R + \tfrac{1}{2}G + \tfrac{1}{4}B\} \cdots \quad (6)$$

$$Y_2 = 4\{\tfrac{1}{4}R + \tfrac{1}{2}G + \tfrac{1}{4}B\} \cdots \quad (7)$$

These are the same as the formula (2). This indicates that each individual luminance signal can be produced from the signal of each line. That is to say, scanning lines twice as many as the usual ones can be obtained in a vertical direction. It is called "two-line luminance signal independent processing" that two liminance signals are obtained by processing two individual signals independently as described above. The examples using said two-line luminance signal independent processing include Japanese Patent Application Laid-Open Nos. 59-50684 and 58-173989.

In accordance with the arts disclosed in the above mentioned documents, a recording means to record the luminance signals $Y_1$ and $Y_2$ is provided, and the odd-numbered line luminance signal $Y_1$ and the even-numbered line luminance signal $Y_2$ recorded in the recording means are changed by field and then outputted, thus enabling a frame picture to be reproduced from the information at the same time during one field period. As a result, there occurs no double image in a frame still picture, which may be caused when imaged with an ordinary camera, and a frame still picture of high image quality can be obtained.

In recent years, furthermore, semiconductor technology has markedly progressed, coupled with the further enlarged capacity and lowered cost of memories as well as the development of high speed A/D and D/A converters for processing of pictures. This has enabled semiconductor video memories to be used for civil-use appliances. In case of the arts disclosed in the above mentioned gazettes as well, frame pictures of high image quality can be easily obtained by using the semiconductor memories as recording means.

In the future, moreover, semiconductor video memories are expected to be used for various purposes in video cameras.

One of the applications of said memories is the so-called electronic zooming-in, which performs zooming-in not by optical means, but by electronic means. Namely, when an area of a picture is once recorded in a video memory and is again read out from the memory, the area is enlarged (by two times assuming that the frequency is ½) on the screen of a cathode ray tube (CRT) by reading out at a lower frequency (for example, ½) than the write frequency in both horizonal and vertical directions.

SUMMARY OF THE INVENTION

In the above described prior art, as many scanning lines as twice the usual ones are obtained through the two-line luminance signal independent processing, and thus, frame still pictures with no double image are ensured.

As clearly indicated by the above mentioned formulae (2), (6), and (7), however, there is a problem that the above described two-line luminance signal simultaneous processing leads the signal amplitude to become ½ of the conventional one and thus causes SN (signal-to-noise) ratio to deteriorate.

No attention is paid to this point in the above mentioned previous examples.

The first object of the present invention is to abate the deterioration of the SN ratio.

In addition, the above mentioned documents take into account the production of frame still pictures with no double image, and do not refer to any other applications of the aforementioned two-line luminance signal independent processing.

The above described electronic zooming-in involves a problem that the resolution deteriorates in inverse proportion to the scale factor of zooming-in.

The second object of the present invention is to abate the above mentioned deterioration of the resolution by applying the two-line luminance signal independent processing to the electronic zooming-in.

Moreover, the third object of the present invention is to improve convenience in using the above mentioned electronic zooming-in.

The above mentioned first object is achieved by the present invention that provides an image pickup apparatus having a first adder which adds a luminance signal $Y_1$ produced from the odd-numbered line signals of a solid-state image sensor and a luminance signal $Y_2$ produced from the even-numbered line signals of the solid-state image sensor; a first subtracter which takes the difference between the luminance signal $Y_1$ and the luminance signal $Y_2$; a noise reducer which reduces the noise of a difference signal $\Delta Y$ obtained by the first subtracter; a second adder which produces a luminance signal $Y_1'$ corresponding to the luminance signal $Y_1$ by adding the difference signal $\Delta Y$ to a sum signal $\Sigma Y$ produced by the first adder; and a second subtracter which produces a luminance signal $Y_2'$ corresponding to the luminance signal $Y_2$ by subtracting the difference signal $\Delta Y$ from the sum signal $\Sigma Y$; and which produces a frame still picture by the luminance signal $Y_1'$ and the liminance signal $Y_2'$.

The above mentioned second object is, furthermore, achieved by the present invention that provides an image pickup apparatus having a memory which simultaneously records the luminance signal $Y_1$ produced from the odd-numbered line signals of the image sensor and the luminance signal $Y_2$ produced from the even-numbered line signal of the image sensor; and a first selection means which selects and outputs a luminance signal $Y_1''$ and a luminance signal $Y_2''$ read out from the memory by extending the time base (luminance signals produced by processing the luminance signal $Y_1$ and the luminance signal $Y_2$); and which produces a zooming-in picture.

The above mentioned third object is, moreover, achieved by the present invention that provides an image pickup apparatus having a selection means which selects and outputs the video signals not processed by electronic zooming-in and the video signals processed by electronic zooming-in and which inserts video signals (obtained with one area processed by zooming-in) into the video signals before the zooming-in and thus displays simulataneously a total view before the zooming-in and an area thereof (for example, an object of attention).

First of all, the means to achieve the first object will be described. The first adder adds the luminance signal $Y_1$ produced from the signals of odd-numbered lines and the luminance signal $Y_2$ produced from the signals of even-numbered lines at a ratio of 1:1. The resulting $\Sigma Y$ is an ordinary luminance signal Y itself during the two-line simultaneous scan, with no deterioration of SN ratio. In addition, the difference signal $\Delta Y$ produced by the first subtracter leads to noise reduction with less deterioration of a picture accomplished by the processing specified below, utilizing the characteristics of the picture signals at a noise reducer.

1) The picture signals include less signal components in an oblique direction, and cause little deterioration of the picture even if it loses information in the direction. The high-frequency components (including the information in an oblique direction) of the above mentioned difference signal is considered as noise and removed by a low pass filter (LPF).

2) The level of noise is lower than those of the signal components. In addition, the level of the difference signal except for the one in an edge portion becomes close to the zero level due to the vertical correlation of the lines of the picture signal, and the noise is focused in the vicinity of the zero level. Thus, the vicinity of the zero level is cored for removal of the noise. At this point, the edge signal is somewhat distorted, but slightly.

While the luminance signals $Y_1'$ and $Y_2'$ corresponding to the odd-numbered lines and even-numbered lines are produced in the second adder and subtracter, SN ratio is improved because these signals are produced from the luminance signal $\Sigma Y$ with no deterioration of SN ratio and the liminance signal $\Delta Y'$ with its noise reduced by a noise reduction means.

With regard to the means to achieve the second object, the two-fold zooming-in, which makes horizontal and vertical read-out frequencies equal to ½ of a write frequency, is considered as the electronic zooming-in of choice. In this case, firstly referring to the horizontal resolution, with the deteriorating part of the horizontal resolution taken into consideration in advance, the number of horizontal picuture elements should be increased, and the horizontal resolution of luminance should be made rather high.

For example, assume that the number of picture elements in a horizontal effective display area is about 800 (a horizontal readout frequency: 14.3 MHz), about 240

TV-lines of the horizontal resolution will be obtained even during zooming-in. This enables the resolution to be comparable to the case of VHS system home VTR, in which the horizontal resolution of luminance during reproduction is around 250 TV-lines.

With reference to the vertical resolution, in the next, the deterioration of resolution is prevented as described below, utilizing the characteristic that the luminance signals $Y_1$ and $Y_2$ of two lines per horizontal scan are obtained in the above described image sensor in which two lines are simultaneously scanned.

That is to say, in a first field, first of all, the luminance signals $Y_1$ and $Y_2$, which are once stored in a memory, is again read out and supplied to a first output and selection circuit. The first output and selection circuit outputs the supplied luminance signals $Y_1$ and $Y_2$ by line. As a result, the signal information in a vertical direction becomes two times more dense than the conventional one, so that a zooming-in picture with less deterioration of the resolution can be obtained.

In the means to achieve the third object, for example, an object desired to be zoomed is caught at the center of a picture, and a signal with the central portion processed by zooming-in and the original signal prior to zooming-in are supplied to the above mentioned selection means. In the selection means, the supplied signal after zooming-in is selected and outputted to an area in a picture (for example, one of the four corners of a screen), and the original signal is outputted in an area other than the one. As a result, a composite signal having a zooming-in picture inserted in an area of the original picture is obtained, so that a wide angle view and the zooming-in picture of an object of attention can be seen simulataneously on the screen of CRT. In addition, since a wide angle view can be simulataneously seen on EVF (electronic viewfinder) when a picture is recorded, the picture becomes easier to be caught even by high-ratio zooming-in, coupled with the upgrading of efficiency in the recording operation.

BRIEF DESCRIPTION OF THE DRAWINGS

FIGS. 2 (a), 2 (b), and 2 (c) are block diagrams showing the examples, respectively, of a noise reducer which is used for the embodiment as shown in FIG. 1;

FIGS. 10 (a) and 10 (b) are schematic illustrations showing the rasters when video signals produced by the embodiment shown in FIG. 9 are displayed on the screen of CRT;

FIGS. 11 (a) and 11 (b) are schematic illustrations showing an object and a zooming-in picture of said object, respectively;

DETAILED DESCRIPTION OF EMBODIMENTS

The embodiments of the present invention will hereunder be described with reference to the drawings.

Figure 1:
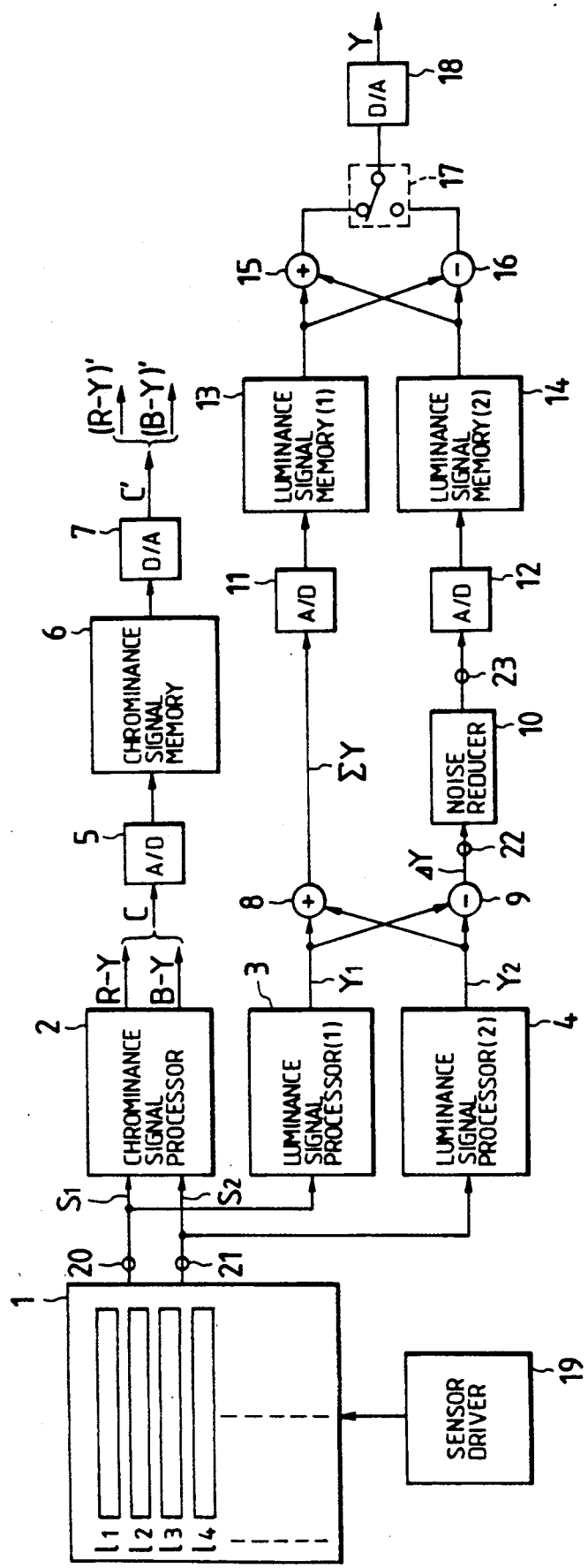
FIG. 1 is a block diagram showing a first embodiment of the present invention.

FIG. 1 is a block diagram showing a first embodiment of the present invention, wherein a reference numeral 1 is a solid-state image sensor, 2 is a chrominance signal processor, 3 and 4 are luminance signal processors, 5, 11 and 12 are A/D converters, 7 and 18 are D/A converters, 8 and 15 are adders, 9 and 16 are subtracters, 17 is a switch, and 19 is a sensor driver which drives the solid image sensor.

In this illustration, furthermore, the output terminal of the odd-numbered line picture elements of the solid-state image sensor is shown by 20, while that of the even-numbered line picture elements of said sensor is shown by 21, and the signals of the odd-numbered and even-numbered lines, respectively, are shown by $S_1$ and $S_2$.

Figure 16:
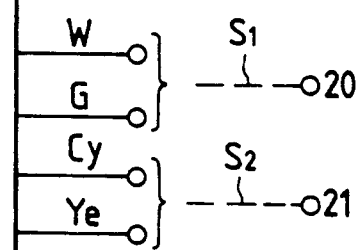
FIG. 16 is a schematic illustration showing one example of the array of picture elements in an MOS type solid-state image sensor.

Here, $S_1$ represents the signals of the odd-numbered lines, and $S_2$ shows the signals of the even-numbered lines. In the solid-state image sensor as shown in FIG. 16, for example, the signals W and G are the signals $S_1$, while the signals $C_y$ and $Y_e$ are the signals $S_2$. The first embodiment is to achieve the first object, which is to improve the luminance SN ratio of a frame still picture with no double image. The operations will be explained below.

Firstly, each driving pulse is supplied from the sensor driver 19 to the solid-state image sensor 1. With the horizontal and vertical scanning caused by the driving pulses, the signal of each picture element is read out from the image sensor 1. As a consequence, the signals $S_1$ and $S_2$, respectively, are simultaneously outputted and supplied to the chrominance signal processor 2 and the luminance signal processors 3 and 4. In the chrominance signal processor 2, a red signal R, a blue signal B, and a green signal G are produced from the supplied picture element signals $S_1$ and $S_2$. With these signals R, B and G further processed, color difference signals (R - Y) and (B - Y) (which may be hereinafter called simply a C signal as combined) are produced and supplied to the A/D converter 5. The C signal is converted into a digital signal by an A/D converter, and a one field portion thereof is once recorded in a chrominance signal memory 6. The C signal recorded in the chrominance signal memory 6 is again read out from the memory to be D/A-converted, resulting in the output of the color difference signals (R - Y)' and (B-Y)'.

In the luminance signal processors 3 and 4, on the other hand, luminance signals $Y_1$ and $Y_2$ are produced from the supplied signals $S_1$ and $S_2$, respectively, and then supplied to the adder 8 and the subtracter 9.

In the adder 8 and the subtracter 9, respectively, a sum signal $\Sigma Y (=Y_1+Y_2)$ taking the total of the fed luminance signals $Y_1$ and $Y_2$ and a difference signal $\Delta Y (=Y_1-Y_2)$ taking the difference between said two luminance signals are producded from these luminance signals, and the sum signal $\Sigma Y$ is supplied to the A/D converter 11, and $\Delta Y$ is supplied to a noise reducer 10. In the noise reducer 10, noise included in the difference signal $\Delta Y$ is reduced.

FIGS. 2 (a), 2 (b), and 2 (c) are block diagrams showing three concrete examples, respectively, of the noise reducer in FIG. 1. Firstly, FIG. 2 (a) shows the noise reducer 10 composed of a low pass filter (hereinafter called LPF), which removes the high-frequency noise of the difference signal $\Delta Y$ with an LPF having a low-pass characteristic (with a cut-off frequency fc accounting for, for example, about 1.5 MHz) as shown by a reference numeral 24. In FIG. 2 (b), the noise reducer 10 is composed of a coring circuit having an input-output characteristic 25, and a micro-amplitude area A (for example, 3% or less of a maximum rating amplitude) of a difference signal is regarded as noise and is removed it. In FIG. 2 (c), a noise reducer is composed of a combination of said LPF and coring circuit, and reduces noise on both sides of the frequency area and the amplitude area. Here, the signal components are also lost together noise, but the loss of signal components is minimal, with little deterioration of image quality, as described previously. The difference signal with its noise reduced is supplied to the A/D converter 12 of FIG. 1. In the A/D converters 11 and 12, the signals supplied respectively are digitized, and further in the luminance signal memories 13 and 14, the supplied signals are recorded during the same field period as the one in which the above described C signal is recorded in the memory 6. Next, in synchronization with the read-out of the C signal from the above mentioned chrominance signal memory 6, signals are read out from luminance signal memories 13 and 14, and said signals $(\Sigma Y)'$ and $(\Delta Y)'$, respectively, are supplied to the adder 15 and the subtracter 16. In the adder 15 and the subtracter 16, addition and subtraction, respecitvely, are carried out as represented by the following formulae, resulting in the production of $Y_1'$ and $Y_2'$.

$$Y_1' = \tfrac{1}{2}(\Sigma Y)' + \tfrac{1}{2}(\Delta Y)'$$

$$Y_2' = \tfrac{1}{2}(\Sigma Y)' - \tfrac{1}{2}(\Delta Y)'$$

$Y_1'$ and $Y_2'$ are further supplied to the switch 17. In the switch 17, $Y_1'$ is selected and outputted in a first field, and $Y_2'$ in a second field, respectively, and they are supplied to the D/A converter 18. In the D/A converter 18, the signals supplied are converted into analogue signals, thus leading to the output of luminance signals.

The above description has referred to a system that uses a field memory as the chrominance signal memory 6 and a frame memory as the luminance signal memories 13 and 14. In case of chrominance signals as well, the frame can be formed if line delay lines, etc. are used as described in the above mentioned document (Japanese Patent Application Laid-Open No. 58-173989). As for the chrominance signals, however, originally they do not require so much resolution, and are therefore sufficed by a system that outputs the same signals (or interporated signals) in first and second fields by genererally using a field memory.

In accordance with this embodiment, as described above, there occurs less deterioration of the luminance resolution as well as no double image because a frame picture is produced from the signals during one field period, leading to the accomplishment of an object of the present invention that is to prevent the deterioration of SN ratio in luminance signals.

Figure 3:
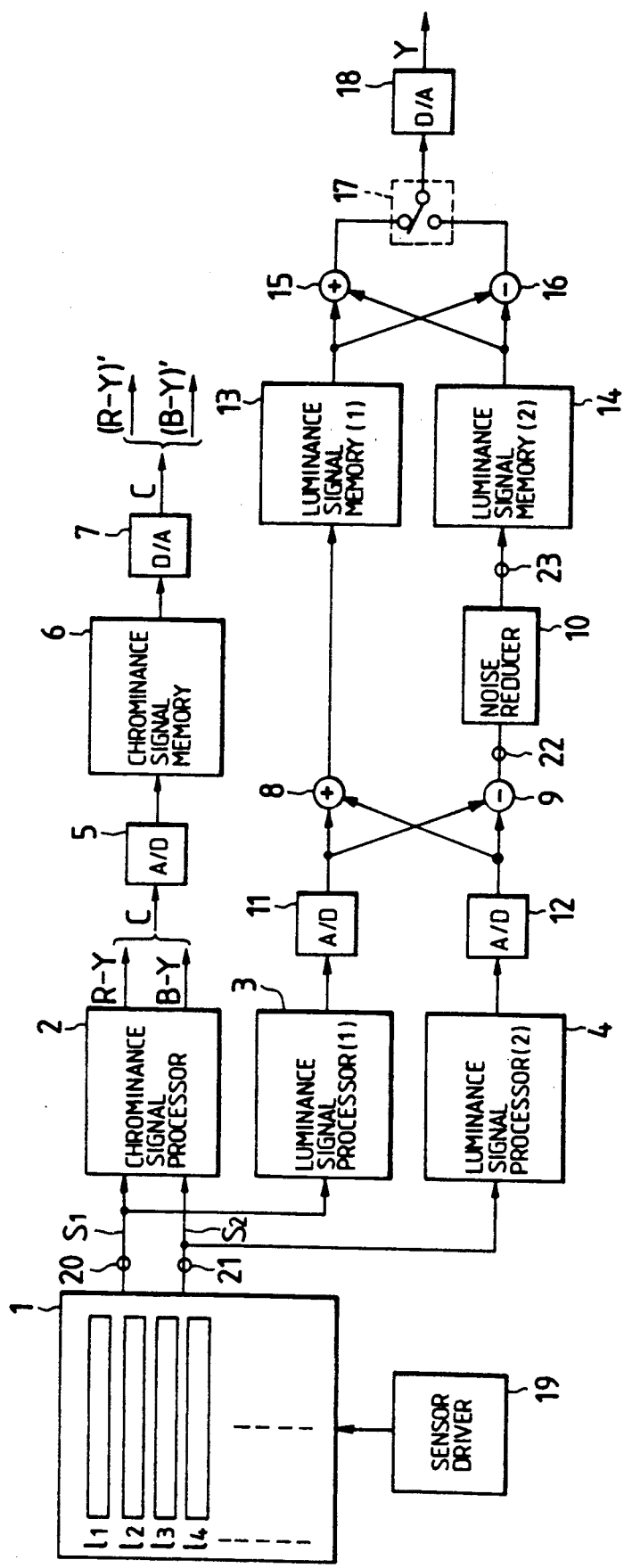
FIG. 3 is a block diagram showing a second embodiment of the present invention.

FIG. 3 is a block diagram showing the third embodiment of the present invention, in which the sections having the same functions as those in the first embodiment are given the same symbols, and their explanations are omitted.

The difference between this embodiment and the first embodiment is found in the locations of the A/D coverters 11 and 12. In the first embodiment, the A/D conversion is performed after the adder 8 and the noise reducer 10, whereas in this embodiment it is performed immediately after the luminance signal processors 3 and 4.

As a result, the adder 8, the subtracter 9, and the noise reducer 10 become digital signal processors. Their basic operaitons, however, remain the very same, with their effects being the same as those in the first embodiment.

Basically, the A/D and D/A conversions have nothing to do with the effects wherever they are, and it is enough if they are performed individually before and after the memory. For example, they may be performed before the luminance signal processors 3 and 4.

Figure 4:
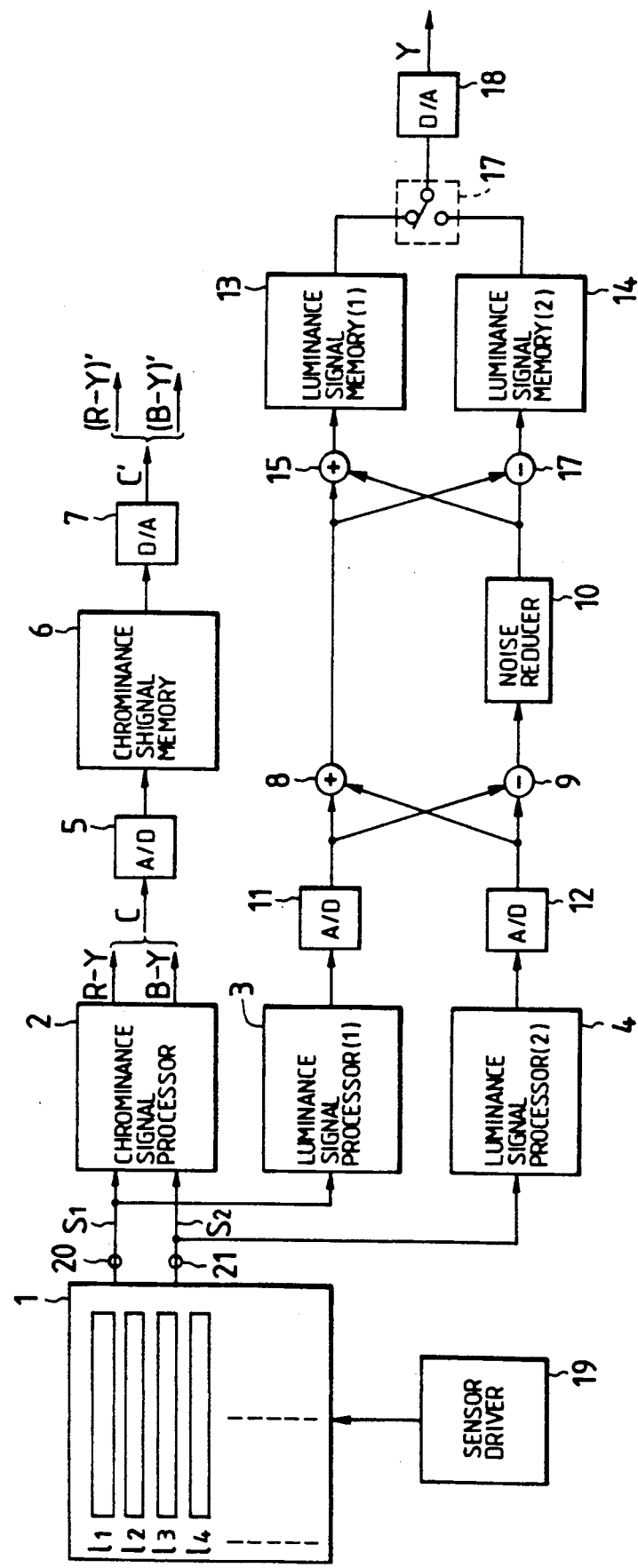
FIG. 4 is a block diagram showing a third embodiment of the present invention.

FIG. 4 is a block diagram showing the third embodiment of the present invention, which differs from the second embodiment in that processing by the adder 15 and the subtracter 16 is performed before the luminance signal memories 13 and 14 in this embodiment.

As a result, not the sum signal $\Sigma Y$ and $\Delta Y$, but two luminance signals with their noise reduced are stored in the luminance signal memories 13 and 14. There is, however, no change in the basic operations, resulting in the same effects as those obtained in the second embodiment.

Figure 5:
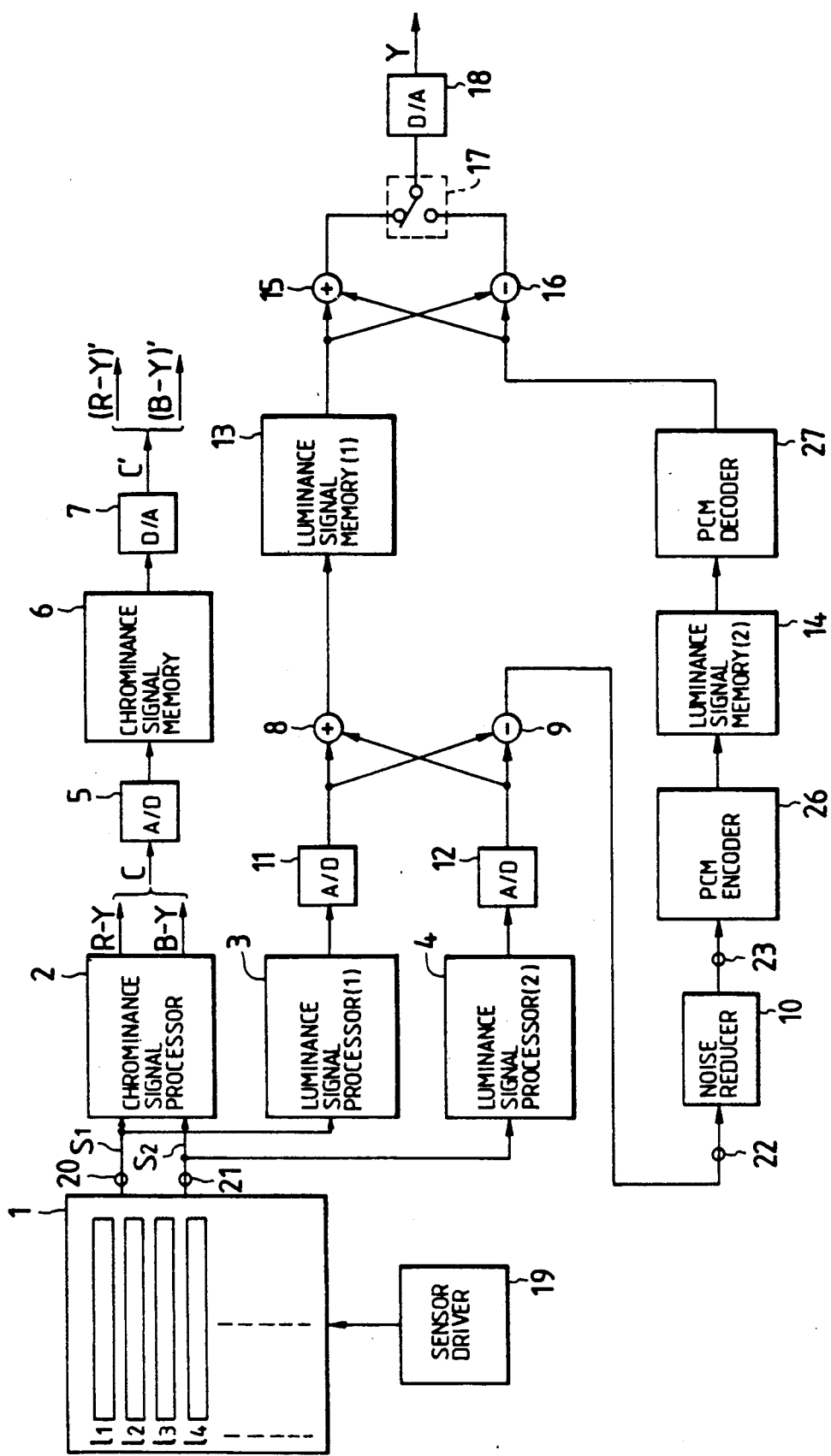
FIG. 5 is a block diagram showing a fourth embodiment of the present invention.

FIG. 5 is a block diagram showing the fourth embodiment of the present invention. In this embodiment, PCM (Pulse Code Modulation) has been applied to achieve a further object of reducing the memory capacity in addition to the above described object.

In this embodiment, as shown in FIG. 4, a PCM encoder 26 is inserted between the noise reducer 10 and the luminance signal memory 14, and a PCM decoder 27 is inserted between the luminance signal memory 14 and the adder 15 & the subtracter 16.

Figure 6:
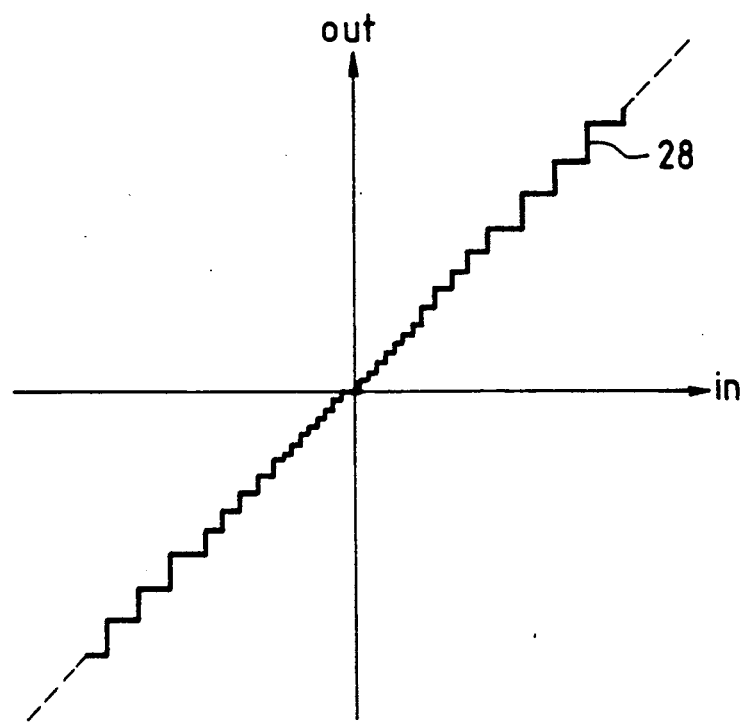
FIGS. 6 and 7 are graphs showing the examples, respectively, of an input-output characteristic with a PCM encoder and a PCM decoder integrated.
Figure 7:
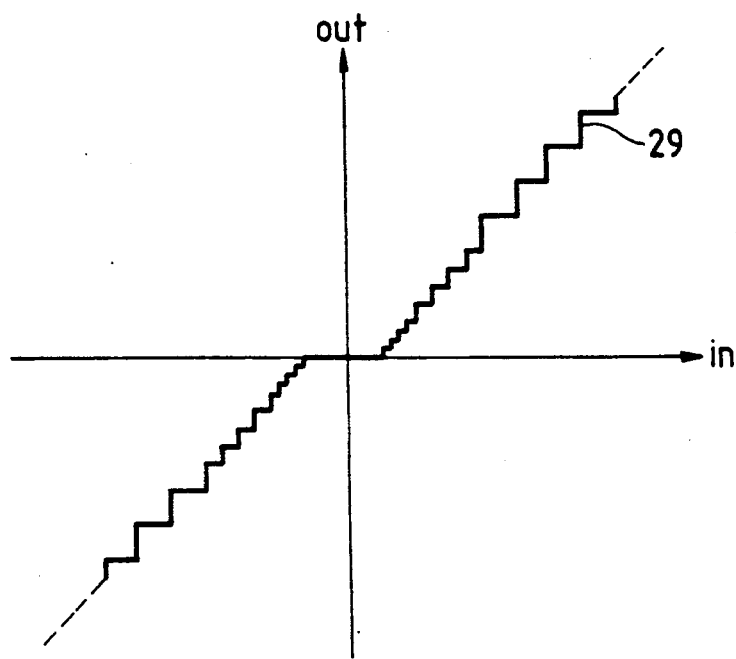

FIGS. 6 and 7 are characteristic diagrams showing one example of an input-output characteristic integrating the PCM encoder and the PCM decoder.

In FIG. 6, it has been arranged that the larger the difference signal $\Delta Y$ is, the greater the difference of the gradation becomes. This is utilizing the characteristic of human eyes that the difference of the gradation becomes more outstanding where the variation volume is smaller, while the difference of the gradation is difficult to find where the variation volume is larger.

Through this non-linearization, the number of bits in the PCM signal can be decreased, and the momory capacity can be reduced. Moreover, assuming that the overall input-output characteristic of PCM is the characteristic as shown in FIG. 7, the circuit can be allowed to have the function of the noise reducer 10 which possesses a base-clipping characteristic and is composed of the previously mentioned base clipping circuit, and can thus be simplified by such an extent.

Figure 8:
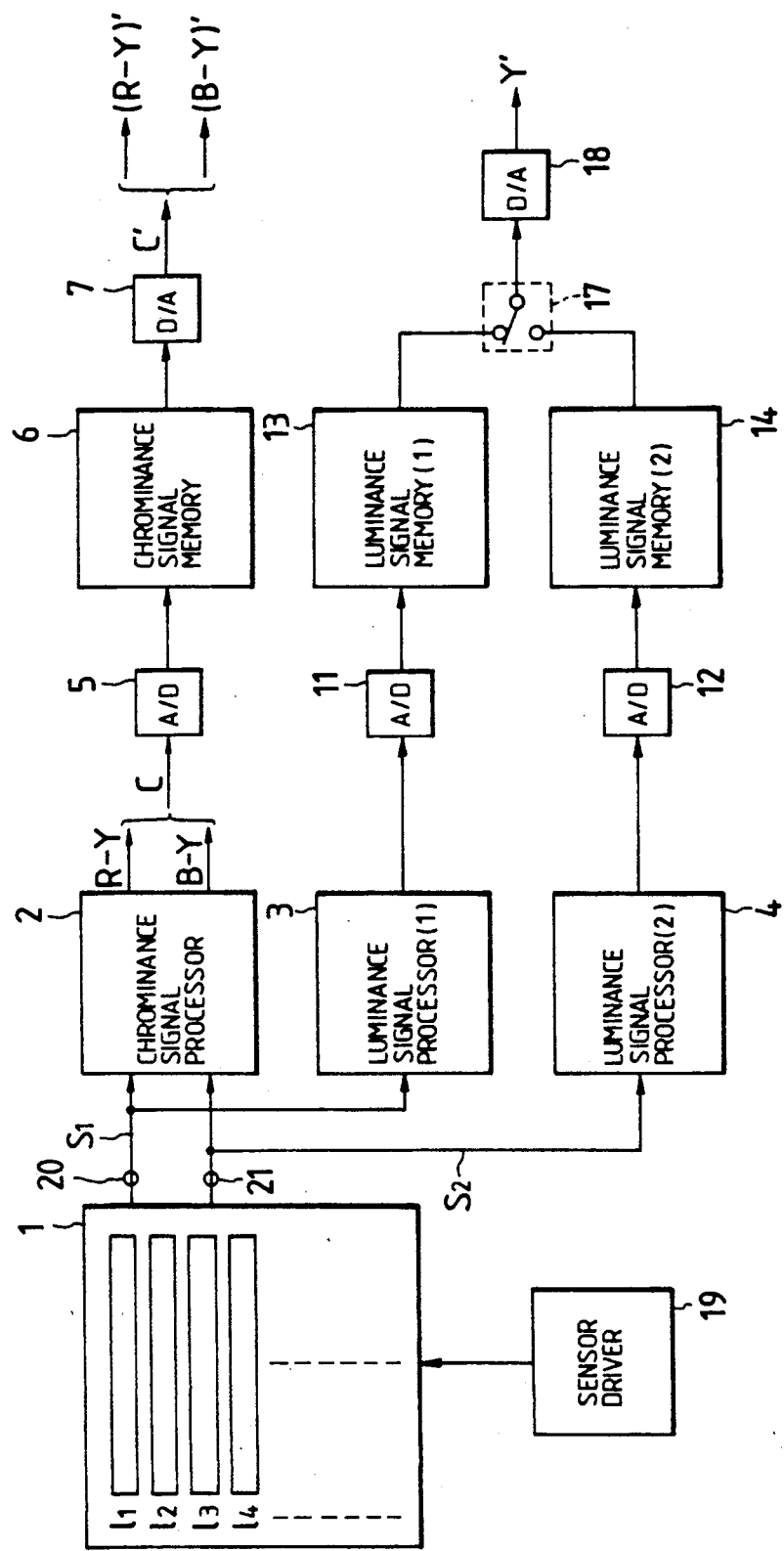
FIG. 8 is a block diagram showing a fifth embodiment of the present invention.

FIG. 8 is a block diagram showing the fifth embodiment of the present invention, which is to achieve the above described second object "to produce a zooming-in picture with less deterioration of the resolution."

The operations of this embodiment will be described below. In this embodiment, however, since the processing with the A/D converters 5, 11 and 12 is the same as in the second embodiment, its explanation will be omitted.

In this illustration, the chrominance signals R - Y and B - Y produced in the chrominance signal processor 2 are converted into digital signals in the A/D converter 5, and are recorded in the chrominance signal memory 6. In the luminance signal processors 3 and 4, in addition, the luminance signals $Y_1$ and $Y_2$ produced from the odd-numbered and even-numbered line signals of the image sensor, respectively, are digitized with the A/D converters 11 and 12 and are recorded in the luminance signal memories 13 and 14. In order to obtain a zooming-in picture as a picture in motion, it is necessary that the chrominance signal memory 6 and the luminance signal memories 13 and 14 can perform write and read-out simultaneously. This can be put into practice by using a so-called dual-port RAM (Random Access Memory) which has individual ports for input and output, respectively.

The data to write in the memory may be generally only those on an area where zooming-in is performed. It is necessary, however, to always record the data on the whole area of the screen in order to enable the still picture of the whole screen to be outputted by ensuring a still picture output mode during zooming-in and further releasing the zooming-in. When the data are read out from the memory, both the color difference signal and the luminance signal are read out at a frequency equivalent to ½ of the write frequency in a horizontal direction, and further in a vertical direction, the same line signals are read out in first and second fields.

The color difference signal read out from the chrominance signal memory is supplied to the D/A converter 7. In the D/A converter 7, the fed signal is converted into an analogue signal, followed by the output of color difference signals (R - Y)' and (B - Y)'. The luminance signals read out from the luminance signal memories 13 and 14 are supplied to the switch 17. In the switch 17, the supplied two luminance signals are alternately selected and outputted by horizontal scanning lines to be supplied to the D/A converter 18. In the D/A converter 18, the supplied signals are converted into an analogue signal, and the luminance signal Y' is outputted.

FIGS. 10 (a) and 10 (b) are the schematic illustrations of the rasters when the video signals produced by this embodiment are displayed on the screen of CRT.

FIG. 10 (a) shows the luminance signal displayed by each horizontal scan, and FIG. 10 (b) shows the chrominance signal displayed likewise by each horizontal scan. $Y_1$, m and $Y_2$, m are brought by enlarging in a horizontal direction part of the luminance signals obtained from the (2m−1)-th line and (2m)-th line from above the solid-state image sensor, and moreover, $C_m$ and $C_m'$ are brought by enlarging in a horizontal direction part of the color difference signals produced from the (2m−1)-th line and (2m)-th line picture element signals (in case of $C_m$) and the (2m)-th line and (2m+1)-th line picture element signals (in case of $C_m'$), respectively (provided that m = 1, 2, 3, 4, . . . ).

In the illustrations, the real lines represent the first field scanning, and the dotted lines represent the second field scanning. The chrominance signals remain the same as in the case of zooming-in by the prior arts, whereas concerning the luminance signals it is clearly seen in FIG. 10 that the resolution has been doubled in each field. In other words, in accordance with this embodiment, the deterioration of the resolution of the luminance signals during zooming-in can be controlled.

Figure 9:
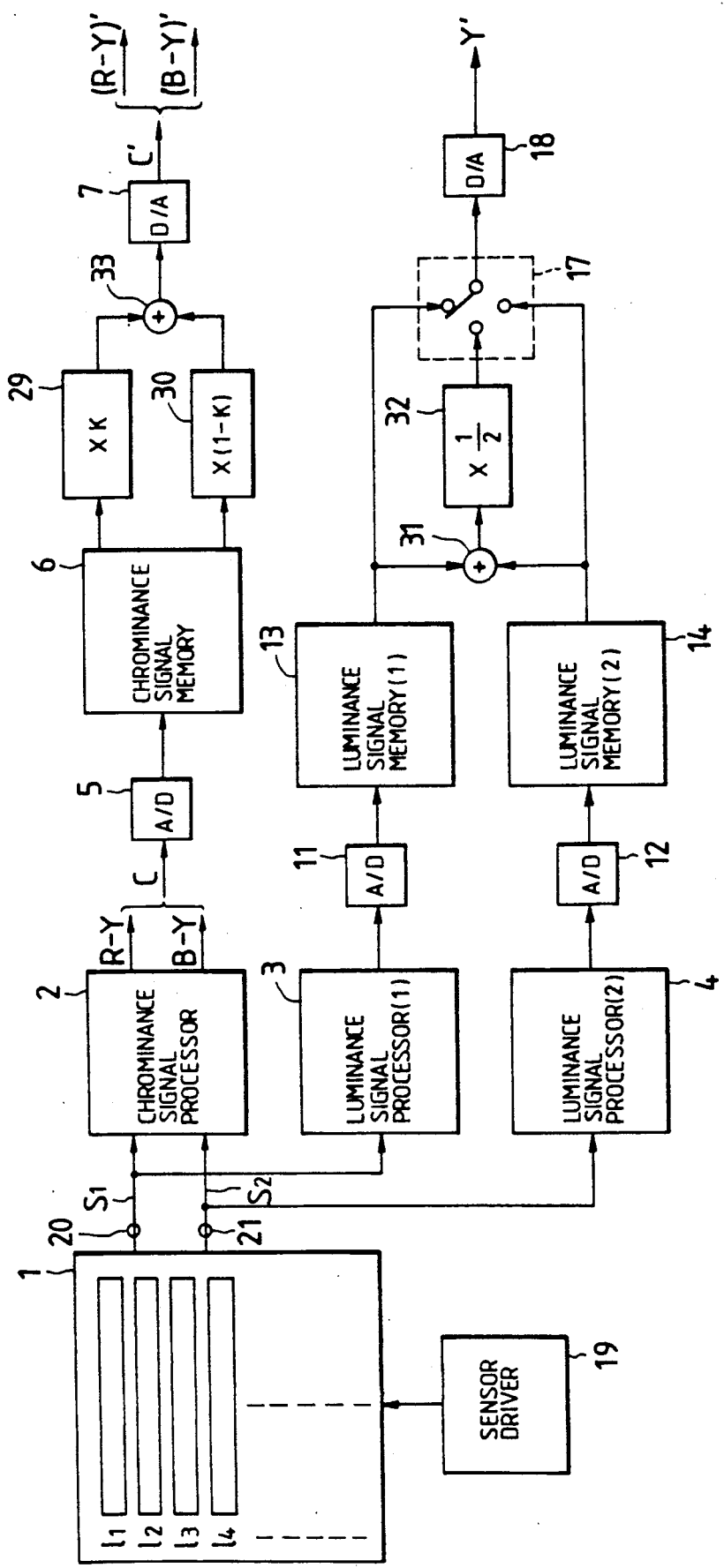
FIG. 9 is a block diagram showing a sixth embodiment of the present invention.

FIG. 9 is a block diagram showing the sixth embodiment of the present invention, and FIGS. 11 (a) and 11 (b) are the schematic illustrations of an object and its zooming-in picture. Assume that in the previously mentioned fourth embodiment an object having a luminance edge along an oblique direction as shown in FIG. 11 (a) is imaged and processed by the electronic zooming-in, a slightly less smooth picture is, as shown in FIG. 11 (b), displayed on CRT. Though looking somewhat differently, the same phenomenon takes place in a color edge.

The sixth embodiment shown in FIG. 9 has achieved the resolution of said phenomenon in the above mentioned fifth embodiment.

In FIG. 9, reference numerals 31 and 33 are adders, and 29, 30 and 32 are coefficient multipliers.

In this embodiment, horizontal scanning line interporation is performed for the luminance and chrominance signals in order to eliminate the unnaturalness of an edge along the oblique direction occurring in the aforementioned fourth embodiment.

Below is a description of said interporation.

Firstly, since the luminance signal has a sufficient number of scanning lines for one field only, interporation is performed not in the first field, but only in the second field. The switch 17 is supplied with the luminance signals $Y_1$ and $Y_2$ read out from the luminance signal memories 13 and 14, respectively, and the luminance signal $$Y'\left( = \frac{Y_1}{2} + \frac{Y_2}{2} \right)$$

multiplied by ½ and produced in the coefficient multiplier 32 after being added in the adder 31 to which $Y_1$ and $Y_2$ are supplied. The switch 17 alternately selects and outputs $Y_1$ and $Y_2$ by line in the first field in the same manner as in the fourth embodiment, and selects and outputs the above mentioned Y' in the second field. Here in the second field, when the signals are read out from the luminance signal memories 13 and 14, the addresses in a vertical direction are counted up alternately by line.

Figure 12A:
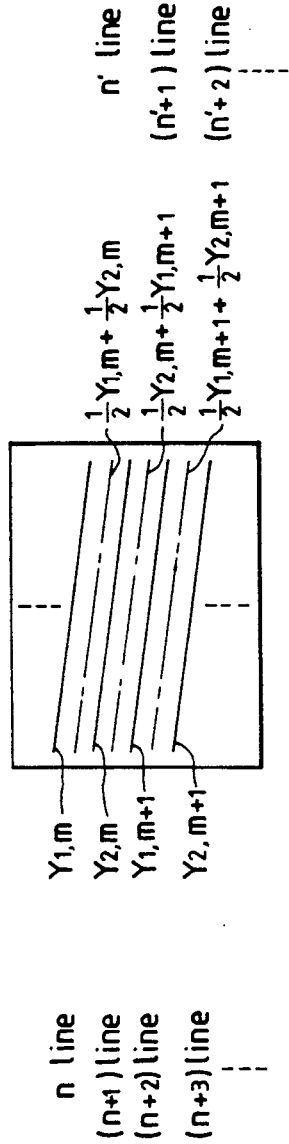
FIGS. 12 (a), 12 (b), and 12 (c) are schematic illustration- explaining the interporation of video signals.
Figure 12B:
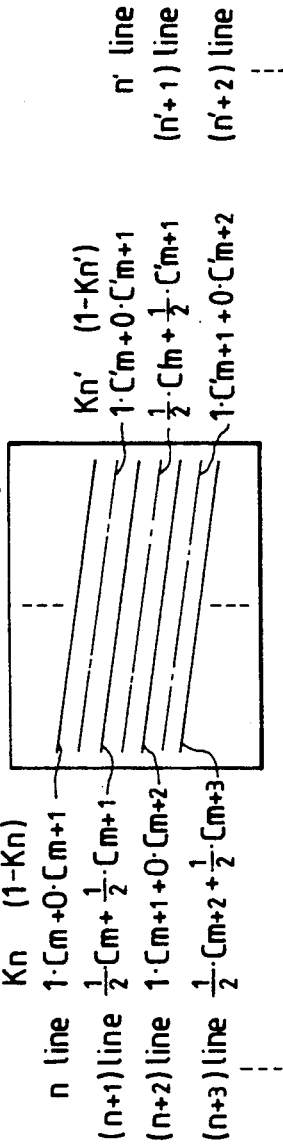
Figure 12C:
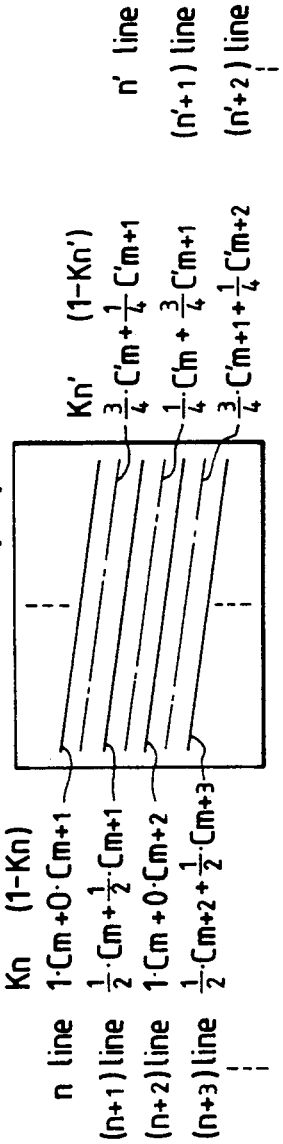

FIGS. 12 (a) and 12 (b) are the schematic illustrations of interporation. As a result of the above mentioned processing, the luminance signals are interporated, as shown in FIG. 12 (a), on the screen of CRT, so that an edge of luminance along the oblique direction becomes smooth.

In the next, the interporation of the chrominance signal will be described with reference to FIGS. 12 (b) and 12 (c).

In the chrominance signal, since the scanning lines obtained account for only a half of those in case of the luminance signal, it is interporated in both of the first and second fields. Always neighboring two-line data are read out from the chrominance signal memory 6, and respectively, are supplied to the coefficient multipliers 29 and 30. In the coefficient multipliers 29 and 30, the supplied color difference signals, respectively, are multiplied by K times and (1−K) times (0≦K≦1) and are then supplied to the adder 33. In the adder 33, the fed signals are added and supplied to the D/A converter 7. In the D/A converter 7, the supplied signals are converted in analogue signals, and signals (R - Y)' and (B - Y)' are outputted. In this case, said coefficient K is changed by scanning line, resulting in the smooth reproduction of an edge along the oblique direction. In FIGS. 12 (b) and 12 (c) showing the interporation examples of the chrominance signal, similar processing is performed in both the first and second fields in FIG. 12 (b), wherein the signals of n'+2l+1 lines (l=0, 1, 2, .. . . . . . . . . ; in the second field, n+2l+1 lines) are interporated by the signals of upper and lower lines. As a result, the unnaturalness of an edge along the oblique direction is improved considerably. In the image sensor 1, however, the two-line simultaneous readout (in which a combination of the two lines simultaneously read out differs between the first and second fields) is carried out, and futhermore, the interlaced scanning is performed on the screen of CRT, so that the picture displayed on the screen of CRT allows its center of gravity to deviate by ½ H (wherein "H" represents one horizontal scanning period) in a vertical direction. As a result, the centers of gravity comes in agreement between the l'+1 lines of the first field and the l' lines of the second field, possibly causing the occurrence of the unnaturalness of the same degree as that before the interporation scanning of the luminance signal.

The unnaturalness has been resolved by taking it into consideration that the above mentioned unnaturalness may be caused by the interporation shown in FIG. 12 (c), and moreover, by changing the interporation in the first field and the second field. That is to say, in the second field, a signal obtained by averaging an l' line signal and (l'+1) line signal is outputted as an l' line signal in the interporation of FIG. 12 (c) so that the center of gravity of a picture may deviate by ½ H against the interporation of FIG. 12 (b). For example, an n' line scanned signal is represented as follows:

$$\tfrac{1}{2}C_m' + \tfrac{1}{2}(\tfrac{1}{2}C_m' + \tfrac{1}{2}C_{m+1}')$$
$$= \tfrac{3}{4}C_m' + \tfrac{1}{4}C_{m+1}'$$
$$(K = \tfrac{1}{4})$$

As a result, the unnaturalness of the color edge can be completely removed.

Figure 13:
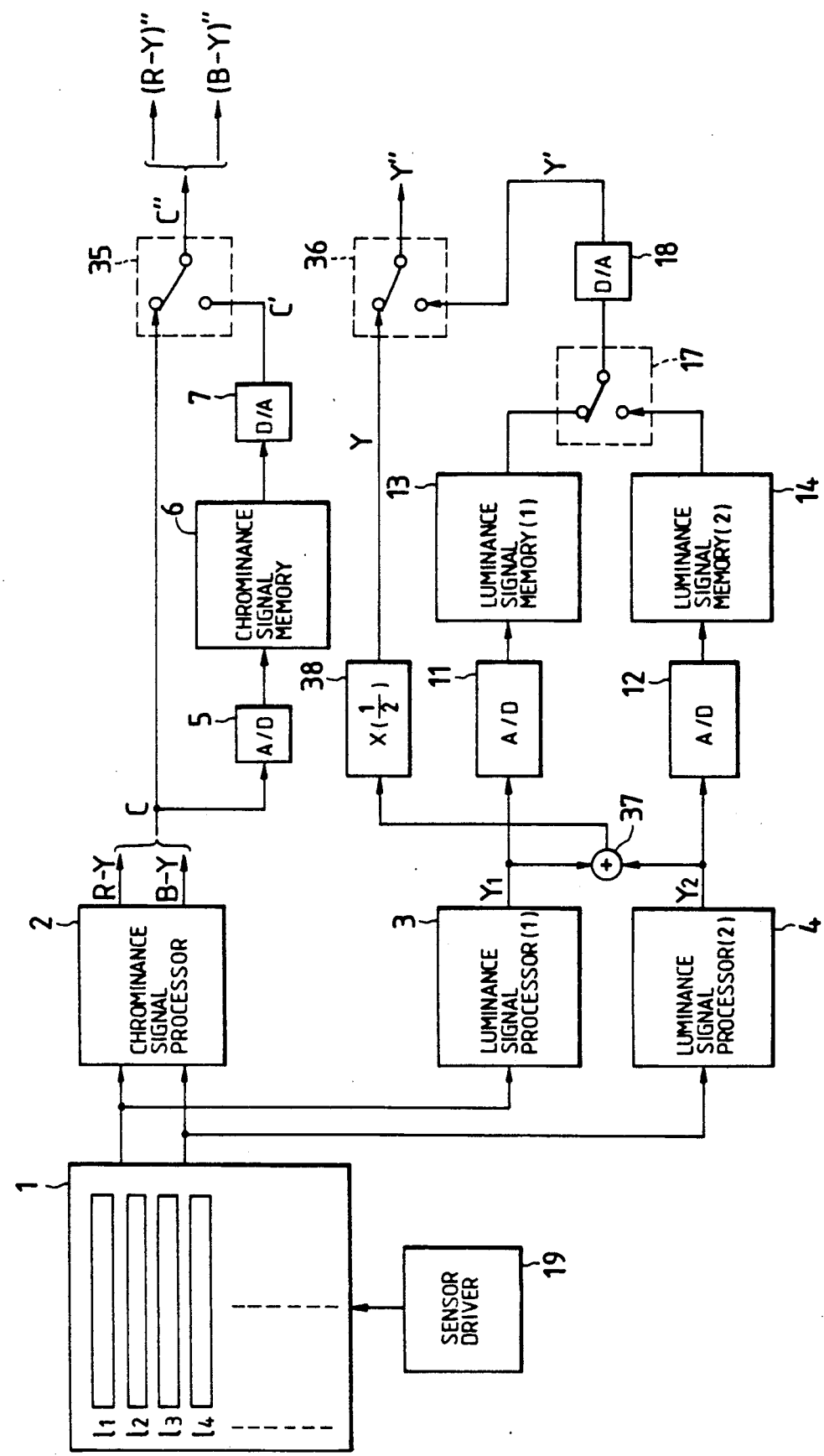
FIG. 13 is a block diagram showing a seventh embodiment of the present invention.
Figure 14:
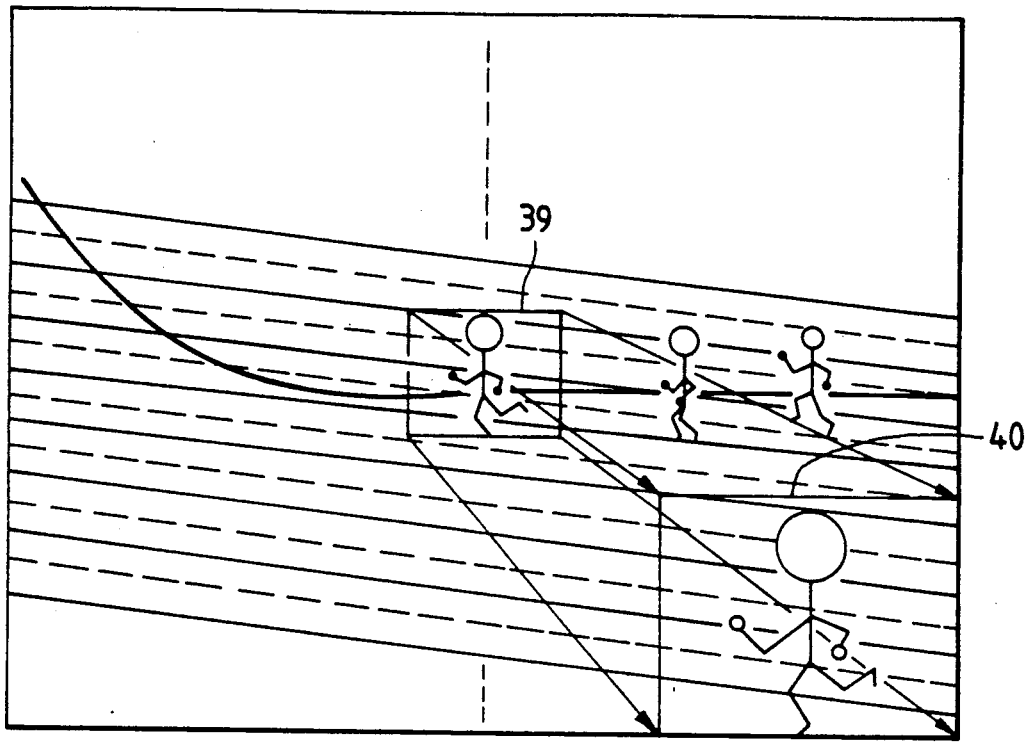
FIG. 14 is a schematic illustration of a picture obtained by the embodiment shown in FIG. 13.

FIG. 13 is a block diagram showing the seventh embodiment of the present invention, and FIG. 14 is a schematic illustration of a picture obtained by a composition of FIG. 13.

This embodiment is to achieve the third object of the present invention as described previously.

In FIG. 13, reference numerals 35 and 36 are switches, 37 is an adder, and 38 is a coefficient multiplier. In the illustration, the sections showing the same operations as those in the above described embodiments are put the same symbols, and their explanation is omitted.

The differences from the above mentioned embodiments will be hereunder described.

In the first place, the chrominance signal processor 2 and the luminance signal processors 3 and 4 are the same as those in the above described second embodiment. The color difference signals (R - Y) and (B - Y) outputted from the chrominance signal processor 2 are fed to the switch 35 and the A/D converter 5, and the luminance signals $Y_1$ and $Y_2$ outputted from the luminance signal processors 1 and 2 are supplied to the adder 37 and the A/D converters 11 and 12.

The supplied two luminance signals $Y_1$ and $Y_2$ are added by the adder 37, and the signals after addition are supplied to the coefficient multiplier 38. In the coefficient multiplier 38, after the supplied signals are multiplied by ½, this luminance signal Y is fed to the switch 36. In the A/D converters 15, 11, and 12, the supplied color difference signal and the luminance signals $Y_1$ and $Y_2$ are converted into digital signals, and are respectively supplied to the chrominance signal memory 6, the luminance signal memories 13 and 14. In each of the memories 6, 13, and 14, some area, for example, an area 39 in FIG. 14 is once recorded, and is further zoomed by reading out from said memory in the same way as that described in the fourth embodiment. The color difference signal and the luminance signal after being zoomed, respectively, are converted into analogue signals by the D/A converters 7 and 18, and are then supplied to the switches 35 and 36 correspondently. In the switches 35 and 36, the unzoomed color difference signal and luminance signal and the zoomed color difference signal and luminance signal supplied from the D/A converters are changed and outputted. Thus, for example, a picture (shown by 40 in the diagram) after zooming-in and a picture 39 before zooming-in are, as shown in FIG. 14, displayed on the same screen of CRT.

In accordance with this embodiment, as described above, the zooming-in portion of an object desired to be zoomed can be displayed on the same screen of CRT in an area of the picture, and a zooming-in picture can thus be taken without narrowing the imaged angle. As a result, the operative efficiency can be upgraded as described previously.

The embodiments individually achieving the above mentioned first to third objects of the present invention, respectively, have been described above. However, the means to achieve the first object can be applied to the embodiments which achieve likewise the second and third objects using the two-line luminance signal independent processing, and the means to achieve the second object can also be applied to the embodiment which natually achieves the third object.

Accordingly, an example of the means to simultaneously achieve some of the above described objects will be explained below.

Figure 15:
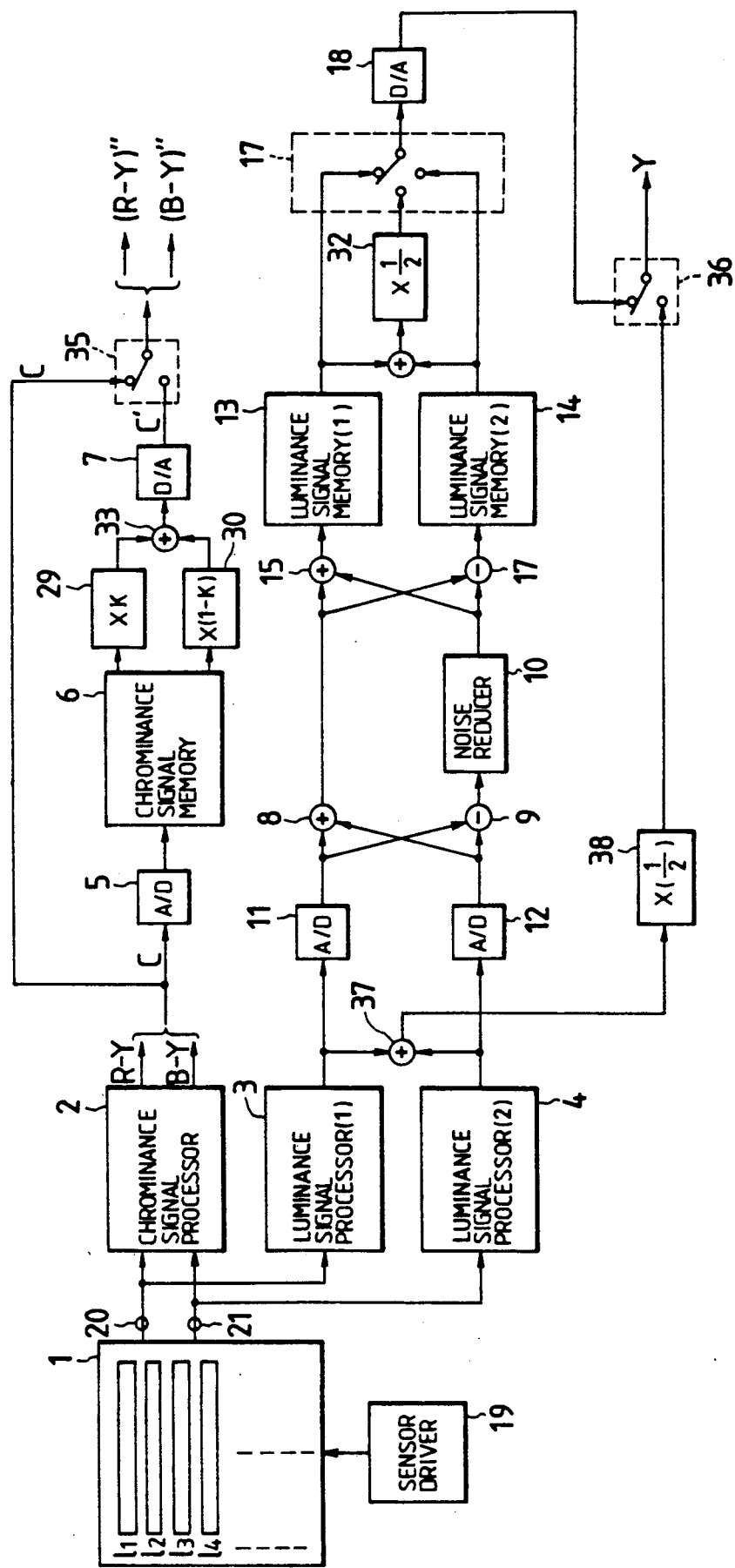
FIG. 15 is a block diagram showing an eighth embodiment of the present invention.

FIG. 15 is a block diagram showing the eighth embodiment of the present invention, an embodiment which achieves simultaneously the first, second, and third objects of the present invention.

As for the operations of each section in this diagram, the same symbol as the one in the previously mentioned embodiments is given to said section, with the description thereof being omitted.

In this diagram, in addition, the processings in the following sections become identical with those in the embodiments specified as the counterparts: up to the A/D converter 5, the adder 15, and the subtracter 17 with the above mentioned third embodiment; from the chrominance signal memory 6 through the D/A converter 7, and from the luminance signal memories 13 and 14 through the D/A converter 18, with the above mentioned sixth embodiment; and moreover, the adder 37, the coefficient multiplier 38, the switches 35 and 36 with the seventh embodiment.

Figure 17:
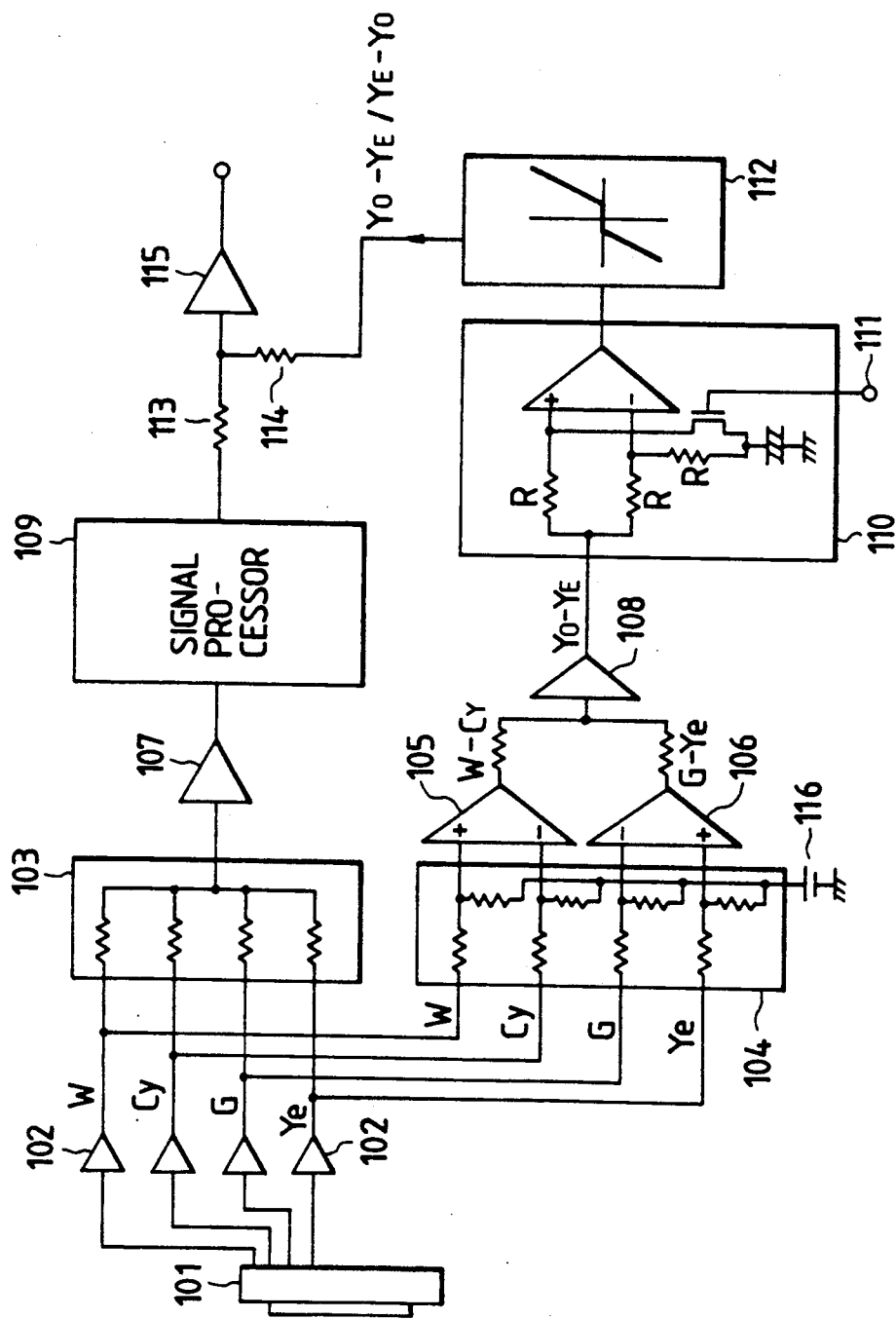
FIG. 17 is a block diagram showing a ninth embodiment of the present invention.

FIG. 17 shows the ninth embodiment of a solid-state image sensor in accordance with the present invention. This embodiment is to achieve the second object of the present invention. In FIG. 17, a reference numeral 101 is a solid-state image sensor, 102 is a preamplifier, 103 and 104 are matrix circuits, 105 and 106 are differential amplifier, 107 and 108 are amplifiers, 109 is a signal processor, 110 is an inverting amplifier, 111 is an input terminal, 112 is a coring circuit, 113 and 114 are resistors, 115 is an output buffer amplifier, and 116 is a voltage source.

In this diagram, the solid-state image sensor 101 is the same as the solid-state image sensor shown in FIG. 16, from which plural signals of two lines to produce the luminance signal and the chrominance signal can be read out independently and simultaneously. The signals W, G, $C_y$, and $Y_e$ outputted from the solid-state image sensor, respectively, are amplified by trimming with the preamplifier 102 having complete gain and frequency characteristics readied, and are then branched into two systems. One of them is supplied to an ordinary luminance matrix circuit 103, where a luminance signal is produced. After being amplified in the amplifier 107, said luminance signal is provided with such processings as the horizontal aperture compensation, the gamma correction, and AGC (automatic gain control) in the signal processor 109.

In the above case, the luminance signal outputted from the matrix circuit 103 is as follows:

$$W + C_y + G + Y_e = (W + G) + (C_y + Y_e)$$
$$= Y_O + Y_E$$

wherein, $Y_O$ represents the odd-numbered line luminance signal, and $Y_E$ represetnts the even-numbered line luminance signal.

Each output signal of the preamplifier 102 is also supplied to the matrix circuit to which a reference voltage is applied from the voltage source 116, and said circuit and the differential amplifiers 105 and 106 cause the production of a signal ($W - C_y$) and a signal ($G - Y_e$). These signals are combined into a signal ($Y_O - Y_E$) produced as a vertical contour signal, which is amplified in the amplifier 108 and then has its polarity inverted by field by the inverting amplifier 110. A simple, concrete example of said inverting amplifier 110 is illustrated in the diagram. Herein, a voltage pulse with the polarity inverted by field is inputted in the inupt terminal 111. The output signal of the inverting amplifier 110 is supplied to the coring circuit 112 for noise reduction, and is then added to the luminance signal outputted from the luminance signal processor 109 by the resistors 113 and 114. The luminance signal is outputted via the output buffer amplifier 115.

Incidentally, the reason why the polarity inversion of the signal is performed by field in the inverting amplifier 110 is nothing but because in the signals W, $C_y$, G, and $Y_e$ outputted from the solid-state image sensor at the same time, the upper and lower relationships between the signals W, G and the signals $C_y$, $Y_e$ are inverted by field.

In a general vertical enhancement system which produces an edge signal from the luminance signals produced from the two-line signals, since enhancement at a spatial frequency of fl/4 (250 TV-lines) is performed by using 1 H delay line (wherein Fl represents a repetition frequency of a scanning line), the resolution in a vertical direction accounts for about 350 TV-lines.

In this embodiment, on the contrary, using the signals ($Y_O - Y_E$) and ($Y_E - Y_O$) as the vertical contour signals enables the enhancement to be performed without necessitating 1 H delay line, and in addition, the enhancing spatial frequency is fl/2 (500 TV-lines), so that the vertical resolution can be at least 450 TV-lines or more. Furthermore, whether to obtain so-called preshoot or to obtain overshoot can be selected by adding the signal ($Y_O - Y_E$) in the odd-numbered fields, and the signal ($Y_E - Y_O$) in the even-numbered fields, to the luminance signal ($Y_O + Y_E$), or by making addition inversely to the above one, and moreover, a balance type obtaining both enhancing signals can be ensured by concomitantly using 1 H delay line.

In this embodiment, furthermore, the signals ($Y_O - Y_E$) and ($Y_E - Y_O$) are not provided with the gamma correction and AGC, and are cored by the coring circuit 112. If the gamma correction and AGC are also provided to the vertical contour signal like the luminance signal ($Y_O + Y_E$), an optimum vertical contour signal could be obtained against any contrasts, but in practice, flickers will occur due to the lack of uniformity of gain or frequency characteristics, and more than that, the deterioration of SN ratio will cause a problem. In this embodiment, as described above, by coring the vertical contour signal instead of providing it with the gamma correction or AGC, a reproduced picture of a high SN ratio entailing no ill effect due to flickers can be produced while reducing the gain during a low contrast or during a low illumination and achieving the upgrade of the resolution at a high contrast spot where maximum sharpness is demanded in terms of vision. In accordance with this embodiment, an image pickup apparatus, which is free from the deterioration of the vertical resolution and possesses the function of electronic zooming-in, can be obtained without increasing the size of the apparatus.

Figure 18:
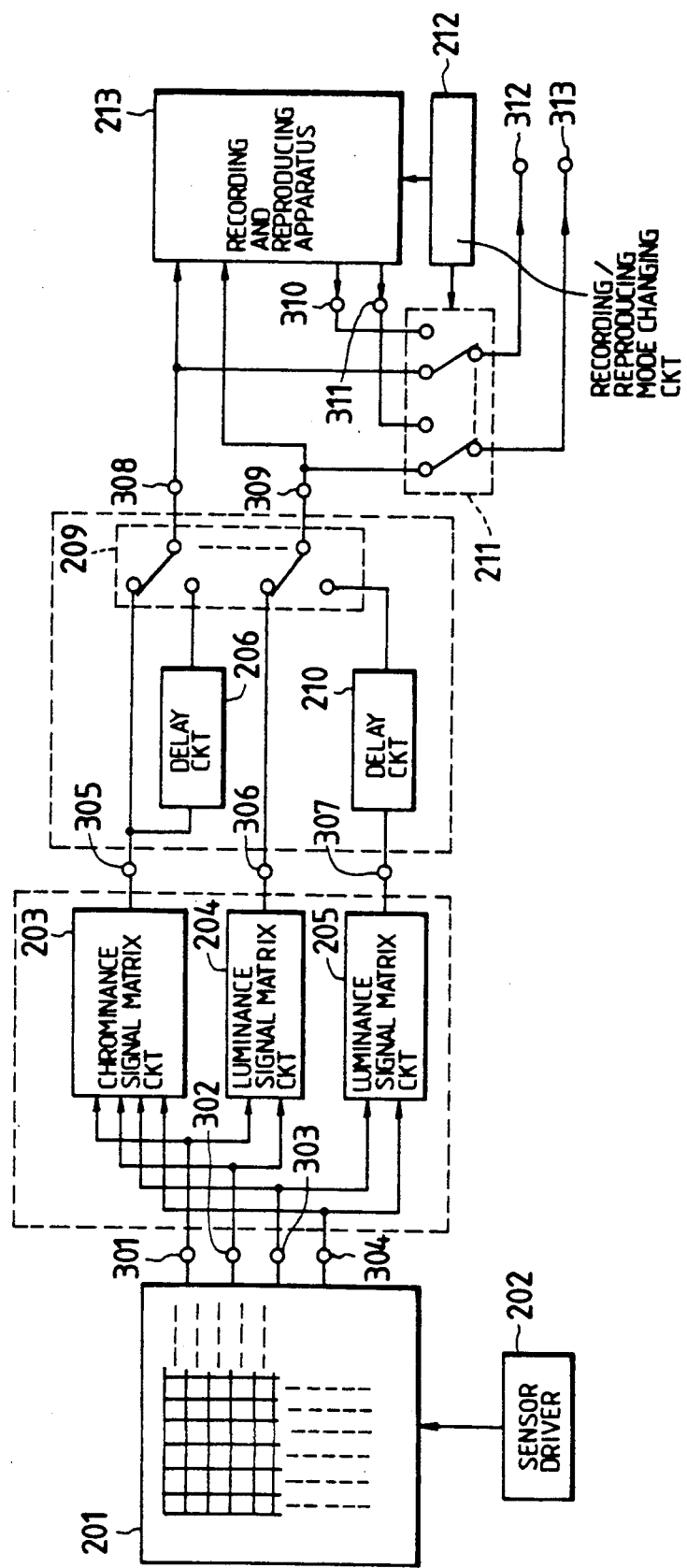
FIG. 18 is a block diagram showing a tenth embodiment of the present invention.

FIG. 18 is a block diagram showing the tenth embodiment of the present invention. In FIG. 18, a reference numeral 201 is a solid-state image sensor of the two-line simultaneous scanning type; 301, 302, 303, and 304 are the output terminals of the sensor 201; 202 is a sensor driver; 203 is a chrominance signal matrix circuit; 305 is the output terminal of the chrominance signal matrix circuit 203; 204 is the luminance signal matrix circuit of the odd-numbered scanning lines; 306 is the output terminal of the luminance signal matrix circuit 204; 205 is the luminance signal reproducing matrix circuit of the even-numbered scanning lines; 307 is the output terminal of the luminance signal matrix circuit 205; 206 and 210 are delay circuits (for example, memory circuits composed of A/D converters, digital memories, and D/A converters) which delay signals by one field hour; 209 and 211 are signal selection switches; 108 is a chrominance signal output terminal; 309 is a luminance signal output terminal; 213 is a recording and reproducing apparatus which records signals in a recording medium and reproduces the signals from the recording medium; 212 is a recording and reproducing mode changing switch which controls the operations of the recording and reproducing apparatus 213, etc. in compliance with the mode as instructed by a button (not illustrated) or the like; 310 is a chrominance signal reproducing and output terminal; 311 is a chrominance signal reproducing and output terminal; 312 is a chrominance signal output terminal; and 313 is a luminance signal output terminal.

Next, the operations of this embodiment will be described below. In accordance with the earlier mentioned documents, signals forming a frame still picture at the same time can be obtained by scanning for one field hour. In FIG. 18, the chrominance signal is outputted to the output terminal 305, a luminance signal $Y_A$ of the odd-numbered horizontal scanning lines to the output terminal 306, and a luminance signal $Y_B$ of the even-numbered horizontal scanning lines to the output terminal 307, respectively. A chrominance signal Nc and one frame still picture can be obtained from N-th field pictures, of which an odd-numbered field picture composed of the luminance signal $Y_A$ will be represented by a symbol $N_A$, and the even-numbered field picture composed of the luminance signal $Y_B$ likewise by a symbol $N_B$.

Figure 19:
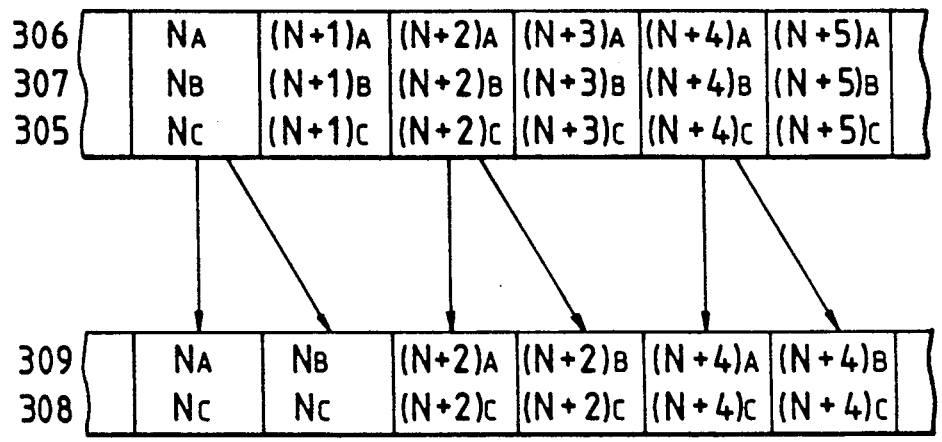
FIGS. 19 and 20 are illustrations explaining the operations of the embodiment shown in FIG. 18.
Figure 20:
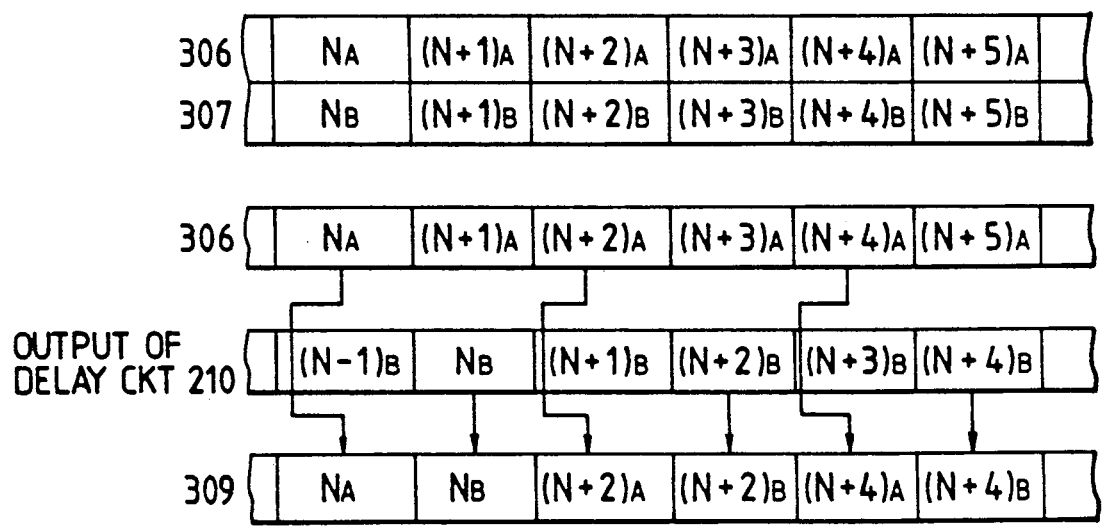

In the picture-in-motion recording mode, in the first place, the recording and reproducing apparatus 213 records the signals of the chrominance signal output terminal 308 and the luminance signal output terminal 309 by the signals from the recording and reproducing mode changing switch 212. In addition, the signal selection switch 211 allows the signal of the output terminal 308 to be outputted to the chrominance signal output terminal 312, and the signal of the output terminal 309 to be outputted to the luminance signal output terminal 313, respectively. And in synchronization with the start of the first horizontal scanning of the sensor 201, the signal selection switch 209 is changed every one field hour. FIG. 20 is a diagram showing the data rows of the luminance signals outputted to the output terminals 306, 307 and the luminance signal output terminal 309, particularly the data rows of the luminance signals outputted to the luminance signal output terminal 309 by the signal selection switch 209 At this point, each pair of luminance signals of 2 field pictures constituting a frame still picture is, as shown in FIG. 3, in turn outputted one by one to the luminance signal output terminal 309. Namely, the luminance signals of a frame still picture obtained every other field hour is continuously outputted. The chrominance signals, which are obtained in the field producing the luminance signals of a frame still picture and are outputted from the output terminal 305, are selected and repetitively outputted to the chrominance signal output teminal 308 over two fields. This relationship is as seen in FIG. 19 showing the data rows of the chrominance signal and luminance signal outputted to the output terminals 305, 306, and 307, the chrominance signal output terminal 308, and the luminance signal output terminal 309 in each field. In other words, with plural frame still pictures recorded continuously in the recording and reproducing apparatus 213, the chrominance signals and luminance signals of said frame still pictures can be outputted to the chrominance signal output terminal 312 and the luminance signal output terminal 313, respectively.

In the picture-in-motion reproducing mode, in the next, the recording and reproducing apparatus 213 outputs the reproduced chrominance signal and luminance signal, respectively, to the reproducing output terminals 310 and 311 by the signals from the recording and reproducing mode changing switch 212. In addition, the signal selection switch 211 allows the signal of the reproducing output terminal 310 to be outputted to the chrominance signal output terminal 312, and the signal of the reproducing output terminal 311 to be outputted to the luminance signal output terminal 313, respectively. Thus, the reproduced chrominance signal and luminance signal, respectively, are outputted to the chrominance signal output terminal 312 and the luminance signal output terminal 313. In short, plural frame still pictures, which are the above mentioned recorded pictures, can be reproduced repetitively. As a consequence, pictures in motion are reproduced.

In a temporary stopping and reproducing mode, since the signals from the recording and reproducing mode changing switch 212 allow the recording and reproducing apparatus 213 to repetitively reproduce the same frames of the pairs of odd-numbered and even-numbered fields by all means, said apparatus 213 outputs the chrominance signal and luminance signal of said frame still pictures, respectively, are outputted to the reproducing output terminals 310 and 311.

In accordance with this embodiment, the recorded information can reproduce a picture in motion, and moreover, since two field pictures constituting a frame picture to be recorded are those at the same time, there is no move of the object between said two field pictures. As a result, no deflection will occur even when said frame picture is reproduced repetitively.

In accordance with this invention, as described above, a superbly functioning image pickup apparatus with the shortcomings of the prior arts eliminated can be provided in that:

(1) said apparatus can produce a frame still picture from the signals for the same field period by using a solid image sensor in which two lines are simultaneously scanned and which can output the signal of each line independently, and can prevent the deterioration of SN ratio by noise reduction, thus achieving the production of a frame still picture with no deflection and of a high image quality;

(2) it can perform zooming-in with less deterioration of the vertical resolution by utilizing its ability to obtain the luminance signals of as many lines as twice the usual number by means of a two-line simultaneous scanning type solid-state image sensor; and (3) the zooming-in function which is convenient to use can be obtained by maing it possible to display a picture before zooming-in and a picture after zooming-in on the same screen.

We claim:

1. An image pickup apparatus comprising:

a solid-state image sensor from which signals of two lines adjacent to each other are simultaneously read out and are outputted separately from each other;

first luminance signal processing means which produces a first luminance signal from the signals of odd-numbered lines outputted from said solid-state image sensor;

second luminance signal processing means which produces a second luminance signal from the signals of even-numbered lines outputted from said solid-state image sensor;

first addition means which produces the sum of said first luminance signal and said second luminance signal;

first subtraction means which produces a first difference signal by taking the difference between said first luminance signal and said second luminance signal;

noise reduction means which produces a second difference signal by reducing the noise of said first difference signal;

second addition means which adds said second difference signal to said sum signal and thus produces a third luminance signal corresponding to said first luminance signal;

second subtraction means which subtracts said second difference signal from said sum signal and thus produces a fourth luminance signal correponding to said second luminance signal; and means for forming a video signal from said third luminance signal and said fourth luminance signal.

2. An image pickup apparatus according to claim 1, wherein said noise reduction means is comprised of low pass filter means which eliminates the high-frequency noise from said first difference signal.

3. An image pickup apparatus according to claim 1, wherein said noise reduction means is comprised of coring means which does not output said first difference signal when the absolute value of the first difference signal is a predetermined threshold level or lower.

4. An image pickup apparatus according to claim 1, wherein said noise reduction means is comprised of low pass filter means which eliminates the high-frequency noise from said first difference signal and coring means which does not output said first difference signal when the absolute value of the first difference signal is a predetermined threshold level or lower.

* * * * *